US011057845B2

(12) United States Patent
Moroga et al.

(10) Patent No.: US 11,057,845 B2
(45) Date of Patent: Jul. 6, 2021

(54) USER EQUIPMENT, BASE STATION, AND TRANSMISSION POWER CONTROL METHOD

(71) Applicant: NTT DOCOMO, INC., Tokyo (JP)

(72) Inventors: Hideyuki Moroga, Tokyo (JP); Yuki Matsumura, Tokyo (JP); Kazuki Takeda, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/344,239

(22) PCT Filed: Aug. 22, 2017

(86) PCT No.: PCT/JP2017/029916
§ 371 (c)(1),
(2) Date: Apr. 23, 2019

(87) PCT Pub. No.: WO2018/083862
PCT Pub. Date: May 11, 2018

(65) Prior Publication Data
US 2019/0261284 A1 Aug. 22, 2019

(30) Foreign Application Priority Data
Nov. 2, 2016 (JP) .............................. JP2016-215702

(51) Int. Cl.
*H04W 52/26* (2009.01)
*H04W 52/14* (2009.01)
(Continued)

(52) U.S. Cl.
CPC .......... *H04W 52/262* (2013.01); *H04W 8/24* (2013.01); *H04W 52/146* (2013.01); *H04W 52/28* (2013.01); *H04W 52/36* (2013.01)

(58) Field of Classification Search
CPC .......... H04W 72/0413; H04W 52/146; H04W 52/28; H04W 52/36; H04W 52/04; H04W 52/262; H04W 52/38
See application file for complete search history.

(56) References Cited

U.S. PATENT DOCUMENTS

| 2015/0173079 A1* | 6/2015 | Yokomakura | ........... H04L 5/001 370/329 |
| 2015/0223177 A1* | 8/2015 | Hayashi | ................ H04W 52/34 370/328 |
| 2016/0044600 A1* | 2/2016 | Kim | .................... H04W 52/325 455/127.1 |

FOREIGN PATENT DOCUMENTS

JP 2012-004829 A 1/2012

OTHER PUBLICATIONS

International Search Report issued in PCT/JP2017/029916 dated Nov. 14, 2017 (3 pages).

(Continued)

*Primary Examiner* — Keith Ferguson
(74) *Attorney, Agent, or Firm* — Osha Bergman Watanabe & Burton LLP

(57) ABSTRACT

Provided is a user equipment in a radio communication system including a base station and the user equipment. The user equipment includes: an acquisition unit that acquires a first transmission power parameter in a case of using OFDM in an uplink and a second transmission power parameter in a case of using DFT-s-OFDM in the uplink; and a control unit that controls transmission power of an uplink signal by using the first transmission power parameter in a case of using ODFM in the uplink, and controls transmission power of the uplink signal by using the second transmission power parameter in a case of using DFT-s-OFDM in the uplink.

7 Claims, 9 Drawing Sheets

(51) Int. Cl.
H04W 52/28 (2009.01)
H04W 52/36 (2009.01)
H04W 8/24 (2009.01)

(56) References Cited

OTHER PUBLICATIONS

Written Opinion of the International Searching Authority issued in PCT/JP2017/029916 dated Nov. 14, 2017 (3 pages).
Huawei, HiSilicon; "Uplink coverage performance of OFDM with PAPR reduction for below 6 GHz"; 3GPP TSG RAN WG1 Meeting #86bis, R1-1608829; Libson, Protugal; Oct. 10-14, 2016 (7 pages).
3GPP TS 36.211 V14.2.0; "3rd Generation Partnership Project; Technical Specification Group Radio Access Network; Evolved Universal Terrestrial Radio Access (E-UTRA); Physical channels and modulation (Release 14)"; Mar. 2017 (194 pages).
3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 pages).
Benjebbour, A. et al.; "5G Radio Access Technology"; NTT Docomo Technical Journal, vol. 17, No. 4, Jan. 2016, pp. 18-29 (26 pages).

* cited by examiner

FIG.3A

| Modulation | Channel bandwidth / Transmission bandwidth (NRB) | | | | | | MPR (dB) |
|---|---|---|---|---|---|---|---|
| | 1.4 MHz | 3 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

FIG.3B

| Band | FREQUENCY | BANDWIDTH | Network Signalling | Resources Blocks ($N_{RB}$) | A-MPR (dB) |
|---|---|---|---|---|---|
| 28 | 700 MHz | 10 MHz × 2 | NS_17 | — | N/A |
| 19 | 800 MHz | 10 MHz × 2 | NS_18 | ≥1 | ≤4 |
| 21 | 1.5 GHz | 15 MHz × 2 | NS_08 | >44 | ≤3 |
| | | | NS_09 | >40 | ≤1 |
| 3 | 1.7 GHz | 20 MHz × 2 | | >55 | ≤2 |
| | | | NS_01 | — | N/A |
| 1 | 2 GHz | 15 MHz × 2 | NS_05 | ≥50 | ≤1 |
| 42 | 3.5 GHz | 40 MHz (TDD) | NS_01 | — | N/A |

FIG.4

| MODULATION METHOD | X of DFT-S-OFDM (dBm) | X of OFDM (dBm) |
|---|---|---|
| BPSK, π/2 shift BPSK | −0.0 | −2.0 |
| QPSK, π/4 shift QPSK | −0.2 | −2.2 |
| 16 QAM | −1.4 | −2.4 |
| 64 QAM | −1.8 | −2.6 |
| 256 QAM | −2.2 | −2.8 |

USER EQUIPMENT, BASE STATION, AND TRANSMISSION POWER CONTROL METHOD

TECHNICAL FIELD

The present invention relates to a user equipment, a base station, and a transmission power control method.

BACKGROUND ART

In long term evolution (LTE), an examination of a radio communication mode called a fifth generation (5G) is in progress so as to realize a further increase in system capacity, a further increase in a data transmission speed, a further low latency in a radio section, and the like. In 5G, an examination of various radio technologies is in progress so as to satisfy a required condition in which latency of a radio section is set to 1 ms or less while realizing a throughput of 10 Gbps or greater. In 5G, there is a high possibility that a radio technology different from LTE is employed. Accordingly, in 3rd generation partnership project (3GPP), a radio network, which supports 5G, is referred to as a new radio network (new radio access network (NR)) for distinguishing from a radio network that supports LTE.

CITATION LIST

Patent Document

Non-Patent Document
Non-Patent Document 1: NTT DOCOMO Ventures, Inc., NTT DOCOMO technical journal "5G radio access technology", January, 2016

SUMMARY OF THE INVENTION

Problem to be Solved by the Invention

Currently, in 5G, an examination of using an access mode that uses orthogonal frequency-division multiplexing (OFDM) in a waveform, and an access mode that uses discrete fourier transform-spread-OFDM (DFT-s-OFDM) in a waveform in combination in an uplink (UL). OFDM has characteristics in which it is possible to realize an SN ratio and a high throughput. On the other hand, DFT-s-OFDM has characteristics in which it is possible to suppress a peak-to-average power ratio (PAPR) to a low ratio, and it is possible to realize wide coverage. In 5G, using of the access modes in a switching manner has been examined to realize a further increase in system capacity, a further increase in a data transmission speed, and coverage securement.

Here, it is known that OFDM is susceptible to performance of a power amplifier (power amp) because the PAPR is high. On the other hand, when considering the cost of a user equipment, consumption power, and the like, it is preferable that a performance requirement, which is demanded for the power amplifier mounted on the user equipment, is not be excessively high. Accordingly, in a case of using OFDM and in a case of using DFT-s-OFDM, it is necessary for the user equipment to include a mechanism that appropriately controls the transmission power. However, in definition of current 3GPP, a mechanism, which controls the transmission power, is not defined in a case of using OFDM in the UL signal and a case of using DFT-s-OFDM in the UL signal.

A technology that is disclosed has been made in consideration of the above-described circumstances, and an object thereof is to provide a technology of controlling transmission power in a UL signal and in a case of using OFDM and in a case of using DFT-s-OFDM in the UL signal.

Means for Solving Problem

According to a technology that is disclosed, there is provided a user equipment in a radio communication system including a base station and the user equipment. The user equipment includes: an acquisition unit that acquires a first transmission power parameter in a case of using OFDM in an uplink and a second transmission power parameter in a case of using DFT-s-OFDM in the uplink; and a control unit that controls transmission power of an uplink signal by using the first transmission power parameter in a case of using ODFM in the uplink, and controls transmission power of the uplink signal by using the second transmission power parameter in a case of using DFT-s-OFDM in the uplink.

Effect of the Invention

According to the technology that is disclosed, it is possible to provide a technology capable of controlling transmission power in a case of using OFDM and in a case of using DFT-s-OFDM in a UL signal.

BRIEF DESCRIPTION OF DRAWINGS

FIG. 3A is a view illustrating an example of MPR in LTE;
FIG. 3B is a view illustrating an example of A-MPR in LTE;
FIG. 4 is a view illustrating a setting example of a back off value.

MODE(S) FOR CARRYING OUT THE INVENTION

Hereinafter, description will be given of an embodiment of the invention with reference to the accompanying drawings. Furthermore, the following embodiment is illustrative only, and an embodiment to which the invention is applied is not limited to the following embodiment. For example, in a radio communication system according to this embodiment, a system of a mode in conformity to LTE is assumed, but the invention is applicable to other modes without limitation to the LTE. Furthermore, in this specification and claims, "LTE" is used in broad meaning including not only a communication mode corresponding to Release 8 or 9 of 3GPP but also a fifth generation (5G) communication mode corresponding to a communication mode subsequent to Release 10, 11, 12, 13, or 14 of the 3GPP unless otherwise stated.

<System Configuration>

Figure 1:
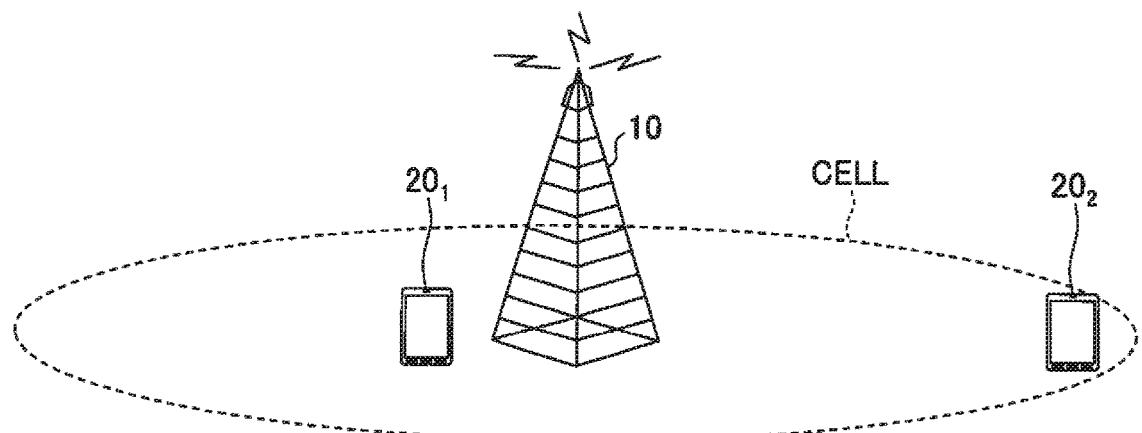
FIG. 1 is a view illustrating a configuration example of a radio communication system according to an embodiment.

FIG. 1 is a view illustrating a configuration example of the radio communication system according to the embodiment. As illustrated in FIG. 1, the radio communication system according to the embodiment includes a base station 10, a user equipment $20_1$, and a user equipment $20_2$. In the example of FIG. 1, one base station 10, and two user equipments $20_1$ and $20_2$ (collectively referred to as "user equipment 20") are illustrated. However, a plurality of the base stations 10 may be provided, and one or three or more user equipments 20 may be provided.

Examples of the user equipment 20 includes a terminal (mobile broadband terminal (MBB)) such as a smartphone that frequently transmits and receives a large amount of data, a terminal (machine type communication (MTC) terminal such as an IoT device that transmits and receives a small amount of data at a low frequency, and the like. In this embodiment, example of the user equipment 20 includes all types (UE categories) of user equipments 20.

The base station 10 accommodates one or more cells, and performs a communication with the user equipment 20 through a radio bearer that is established between the base station 10 and the user equipment 20. The base station 10 may be referred to as "enhanced NodeB (eNB)", "new radio (NR) node", "gNB", "evolution LTE enhanced NodeB (eLTE eNB)", and the like.

The base station 10 and the user equipment 20 supports the entirety of an access mode that uses OFDM (may be referred to as cyclic prefix (CP)-OFDM) in a waveform of a UL signal, and an access mode that uses DFT-s-OFDM in the waveform of the UL signal. The user equipment 20 performs transmission of the UL signal by using any one of OFDM and DFT-s-OFDM on the basis of an instruction from the base station 10, or on the basis of a state of the user equipment 20, and the like.

Furthermore, the access mode in which DFT-s-OFDM is used in a waveform is also be referred to as single carrier-frequency division multiple access (SC-FDMA). In addition, the access mode that uses OFDM in a waveform is also referred to as orthogonal frequency-division multiple access (OFDMA) Accordingly, in the following description, "case of using OFDM in a waveform", "case of using OFDM", and the like may be substituted with "case of using OFDMA". Similarly, "case of using DFT-s-OFDM in a waveform", "case of using DFT-s-OFDM", and the like may be substituted with "case of using SC-FDMA".

<Procedure>

Figure 2:
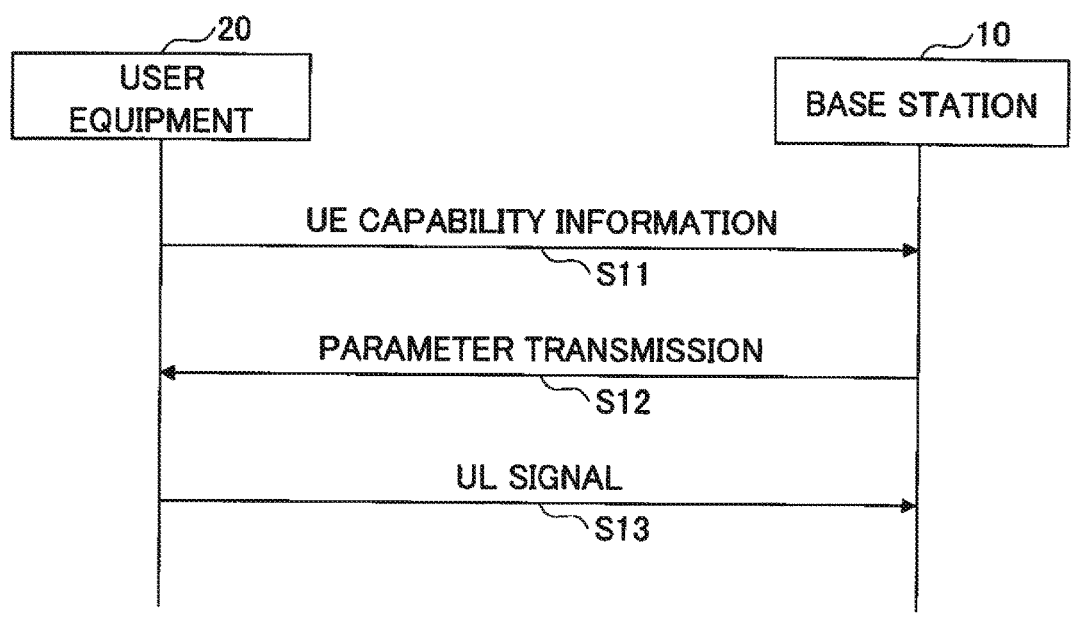
FIG. 2 is a sequence diagram illustrating an example of a procedure that is performed by the radio communication system according to the embodiment.

FIG. 2 is a sequence diagram illustrating an example of a procedure that is performed by the radio communication system according to the embodiment.

In step S11, the user equipment 20 notifies UE capability information of the user equipment 20 of the base station 10. The notification of the UE capability information is a procedure that is performed at the time of initial connection, at the time of hand-over, and the like, and the UE capability information includes information indicating various kinds of UE capability which are provided to the user equipment 20, and a UE category.

In step S12, the base station 10 notifies the user equipment 20 of a value of a parameter (may be referred to as a transmission power parameter) that is applied when determining transmission power of a UL signal. More specifically, the base station 10 notifies the user equipment 20 of a parameter that is applied in a case of using OFDM in the UL, and a parameter that is applied in a case of using DFT-s-OFDM in the UL.

In step S13, the user equipment 20 controls transmission power by using the parameter, which is given in notification in step S12, when transmitting the UL signal. Alternatively, the user equipment 20 controls transmission power by itself when transmitting the UL signal on the basis of a waveform (ODFM or DFT-s-OFDM) that is used in the UL signal.

<Transmission Power Control Method>

Continuously, description will be given of a method of controlling transmission power by the user equipment 20 in step S13 of FIG. 2 with reference to a plurality of examples. In this embodiment, basically, in a case where OFDM is used, a control is performed so that transmission power or maximum transmission power becomes lower (is permitted to be lower) in comparison to a case where DFT-s-OFDM is used. According to this, even when OFDM is used, it is possible to suppress an increase in a PAPR and it is possible to suppress a performance requirement (specifically, an area of a linear region) that is demanded for a power amplifier provided to the user equipment 20. In addition, according to this, it is possible to realize a reduction in the manufacturing cost of the user equipment 20, an improvement of a battery lifetime due to a reduction in power consumption, and the like. A transmission power control method (Method 1) to a transmission power control method (Method 6) to be described below may be combined in an arbitrary manner.

(Transmission Power Control Method (Method 1))

In LTE of the related art, a maximum power reduction (MPR) that permits a maximum transmission power reduction, and an additional maximum power reduction (A-MPR) are defined. The maximum power reduction represents an upper limit value at which a maximum transmission power reduction is permitted in accordance with a transmission bandwidth and a modulation mode in order for the power amplifier of the user equipment 20 to operate in a linear region. The additional maximum power reduction represents is an upper limit value at which a maximum transmission power reduction is permitted so as to satisfy a demand (for example, a requirement related to spurious emission) of a specific region. FIG. 3(a) illustrates the value of the maximum power reduction defined in LTE, and FIG. 3(b) illustrates the value of the additional maximum power reduction defined in LTE.

Even in 5G, it is assumed that the MPR and the A-MPR are defined. Here, in the transmission power control method (Method 1), values of the MPR and values of the A-MPR, which are respectively different from each other between a case where OFDM is used in the UL signal and a case where DFT-s-OFDM is used in the UL signal, are applied. In a case where OFDM is used in the UL signal, the user equipment 20 calculates transmission power in a maximum transmission power range that is determined by the MPR and the A-MPR which are applied in a case where OFDM is used. In addition, in a case where DFT-s-OFDM is used in the UL signal, the user equipment 20 calculates the transmission power in a maximum transmission power range that is determined by the MPR and the A-MPR which are applied in a case where DFT-s-OFDM is used.

The value of the MPR and the A-MPR which are applied in a case where OFDM is used, and the value of the MPR and the A-MPR which are applied in a case where DFT-s-OFDM is used are determined in advance as standard specifications, and the user equipment 20 may store the values, which are determined as standard specifications, in advance in a storage unit such as a memory. In this case, the user equipment 20 may acquire the value of the MPR and the A-MPR, which are to be applied from the storage unit thereof on the basis of a waveform that is used in the UL signal, and thus step S12 in FIG. 2 may be omitted. The base station 10 may notify the user equipment 20 of the value of the MPR and the A-MPR which are applied in a case where OFDM is used and the value of the MPR and the A-MPR which are applied in a case where DFT-s-OFDM is used in step S12 of FIG. 2. In this case, the "parameter" in step S12 corresponds to the value of the MPR and the A-MPR.

The value of the MPR and the A-MPR which are applied in a case where OFDM is used may be greater than the value of the MPR and the A-MPR which are applied in a case where DFT-s-OFDM is used. That is, in a case where OFDM is used, the user equipment 20 may be configured to further reduce the maximum transmission power in comparison to a case where DFT-s-OFDM is used.

A difference between the value of the MPR and the A-MPR which are applied in a case where OFDM is used, and the value of the MPR and the A-MPR which are applied in a case where DFT-s-OFDM is used may be the same regardless of a transmission bandwidth, a modulation mode, a resource allocation situation, and the like, or may be different in accordance with the transmission bandwidth, the modulation mode, the resource allocation situation, and the like.

As the value of the MPR and the A-MPR in OFDM/DFT-s-OFDM, values different from each other may be set in correspondence with the type of the UL signal. For example, in a signal of a physical uplink control channel (PUCCH), a signal of a physical uplink shared channel (PUSCH), and a signal of a sounding reference signal (SRS), values different from each other may be set.

As described above, according to the transmission power control method (Method 1), the user equipment 20 can control the maximum transmission power in correspondence with the waveform of the UL signal.

(Transmission Power Control Method (Method 2))

In LTE of the related art, the user equipment 20 calculates the transmission power of the UL signal by using a predetermined calculation expression on the basis of a bandwidth (M) of a resource that is allocated, desired reception power ($P_O$), a propagation loss (path loss (PL)), an offset value (Δ) based on a modulation mode, and the like. Even in 5G, it is assumed that the user equipment 20 calculates transmission power by using a predetermined calculation expression. Here, in the transmission power control method (Method 2), it is possible to control the transmission power in correspondence with the waveform of the UL signal by adding a back off value corresponding to the waveform of the UL signal to the calculation expression for the transmission power calculation.

Hereinafter, description will be given of an example of the calculation expression for transmission power calculation through addition of the back off value (X). $P_{PUSCH}$ represents an example of a calculation expression in the physical uplink common channel (PUSCH), and $P_{SRS}$ represents an example of a calculation expression in the sounding reference signal (SRS). Furthermore, an underlined portion is a calculation expression in LTE, and thus the underlined portion may be substituted with a calculation expression defined in 5G.

$$P_{PUSCH}=10\log10(M\text{PUSCH})+PO\_PUSCH+\alpha\cdot PL+\Delta TF(TF(i))+f(i)+X \quad \text{[Math 1]}$$

$$P_{SRS}=PSRS\_OFFSET+10\log10(M\text{PUSCH})+PO\_PUSCH+\alpha\cdot PL+\Delta TF(TF(i))+f(i)+X \quad \text{[Math 2]}$$

The back off value (X), which is applied in a case where OFDM is used, may be a value that is smaller than a back off value (X) that is applied in a case where DFT-s-OFDM is used. In addition, the back off value (X) may be variable in correspondence with a modulation mode. FIG. 4 illustrates a setting example of the back off value. According to the example of FIG. 4, transmission power in a case where OFDM is used is controlled to be lower than transmission power in a case where DFT-s-OFDM is used.

The back off value (X) that is applied in a case where OFDM is used, and the back off value (X) that is applied in a case where DFT-s-OFDM is used may be determined in advance as standard specification, and the user equipment 20 may store the value determined as the standard specifications in a storage unit such as a memory in advance. In this case, the user equipment 20 may acquire a value of the back off value (X), which is to be applied, from the storage unit of the user equipment 20 on the basis of the waveform that is used in the UL signal, and thus step S12 of FIG. 2 may be omitted. In addition, the base station 10 may notify the user equipment 20 of the back off value (X) that is applied in a case where OFDM is used, and the back off value (X) that is applied in a case where DFT-s-OFDM is used in step S12 of FIG. 2. In this case, the "parameter" in step S12 corresponds to the back off value (X).

As described above, according to the transmission power control method (Method 2), the user equipment 20 can control the transmission power in correspondence with the waveform of the UL signal.

(Transmission Power Control Method (Method 3))

In 5G, it is assumed that a user equipment 20 including a high-performance power amplifier (a power amplifier in which a linear operation region is wide), and a user equipment 20 including a low-cost power amplifier (a power amplifier in which the linear operation region is narrow) are permitted. Here, in the transmission power control method (Method 3), it is possible to control the transmission power in correspondence with UE capability (an area of the linear operation region in the power amplifier) that is provided to the user equipment 20. For example, with regard to the user equipment 20 including the low-cost power amplifier (the power amplifier in which the linear operation region is narrow), the back off value (X) is set in such a manner that the transmission power becomes lower in comparison to the user equipment 20 including the high-performance power amplifier (the power amplifier in which the linear operation region is wide).

In step S11 of FIG. 2, the user equipment 20 may notify the base station 10 of the UE capability relating to the area of the linear operation region in the power amplifier, and the base station 10 may determine the back off value (X) to be applied to the user equipment 20 in correspondence with the UE capability that is given in notification. At this time, the base station 10 may notify the user equipment 20 of a modulation mode and a waveform (OFDM or DFT-s-OFDM) to be used in the UL signal in addition to the back off value (X).

In addition, the back off value (X), which is to be applied in correspondence with the UE capability (the area of the linear operation region in the power amplifier) may be determined in advance as standard specification, and the user equipment 20 may store the back off value, which is determined as the standard specification, in a storage unit such as a memory in advance. When the user equipment 20 acquires the back off value corresponding to the UE capability of the user equipment 20 from the storage unit to determine the transmission power. In addition, the back off value (X) may be determined in correspondence with a waveform (OFDM or DFT-s-OFDM) and/or a modulation mode that is used in the UL signal in addition to the UE capability. For example, in the standard specifications, the back off value (X) illustrated in FIG. 4 may be individually defined for the UE capability, and the user equipment 20 may acquire the back off value (X) corresponding to the UE capability of the user equipment 20, and the waveform that is used in the UL signal and the modulation mode to calculate the transmission power.

As described above, according to the transmission power control method (Method 3), it is possible to control the transmission power in correspondence with the UE capability of the user equipment 20 and the waveform of the UL signal.

(Transmission Power Control Method (Method 4))

In a transmission power control method (Method 4), it is possible to control the transmission power in correspondence with a UE category of the user equipment 20. More specifically, the back off value (X) described in the transmission power control method (Method 2) is switched in correspondence with the UE category of the user equipment 20.

For example, in the standard specification, a UE category in which only resource allocation (or only a modulation mode) with a small PAPR is permitted, and a UE category to which the restriction is not applied may be defined. When the UE categories are defined, for example, with respect to a user equipment 20 in the UE category in which only the resource allocation (or only the modulation mode) with a small PAPR is permitted, it is possible to permit transmission power that is greater in comparison to the user equipment 20 of an UE category to which the limitation is not applied.

In step S11 of FIG. 2, the user equipment 20 may notify the base station 10 of the UE category of the user equipment 20, and the base station 10 may determine the back off value (X) to be applied to the user equipment 20 in correspondence with the UE category that is given in notification. At this time, the base station 10 may notify the user equipment 20 of a modulation mode and a waveform (OFDM or DFT-s-OFDM) to be used in the UL signal in addition to the back off value (X).

In addition, the back off value (X) to be applied to the UE category may be determined as standard specifications in advance, and the user equipment 20 may store the back off value, which is determined as the standard specifications in advance, in a storage unit such as a memory. The user equipment 20 acquires the back off value corresponding to the UE category of the user equipment 20 from the storage unit to determine transmission power. In addition, the back off value (X) may be determined in correspondence with the waveform (OFDM or DFT-s-OFDM) that is used in the UL signal and/or the modulation mode in addition to the UE category. For example, in the standard specifications, the back off value (X) illustrated in FIG. 4 may be individually defined for each UE category, and the user equipment 20 may acquire the back off value (X) corresponding to the UE category of the user equipment 20, the waveform that is used in the UL signal, and the modulation mode to calculate the transmission power.

As described above, according to the transmission power control method (Method 4), it is possible to control the transmission power in correspondence with the UE category of the user equipment 20 and the waveform of the UL signal.

(Transmission Power Control Method (Method 5)

In the transmission power control method (Method 5), the base station 10 determines a parameter that is given to the user equipment 20 in notification in step S12 of FIG. 2 on the basis of the waveform (OFDM or DFT-s-OFDM) that is used in the UL by an adjacent cell.

Figure 5:
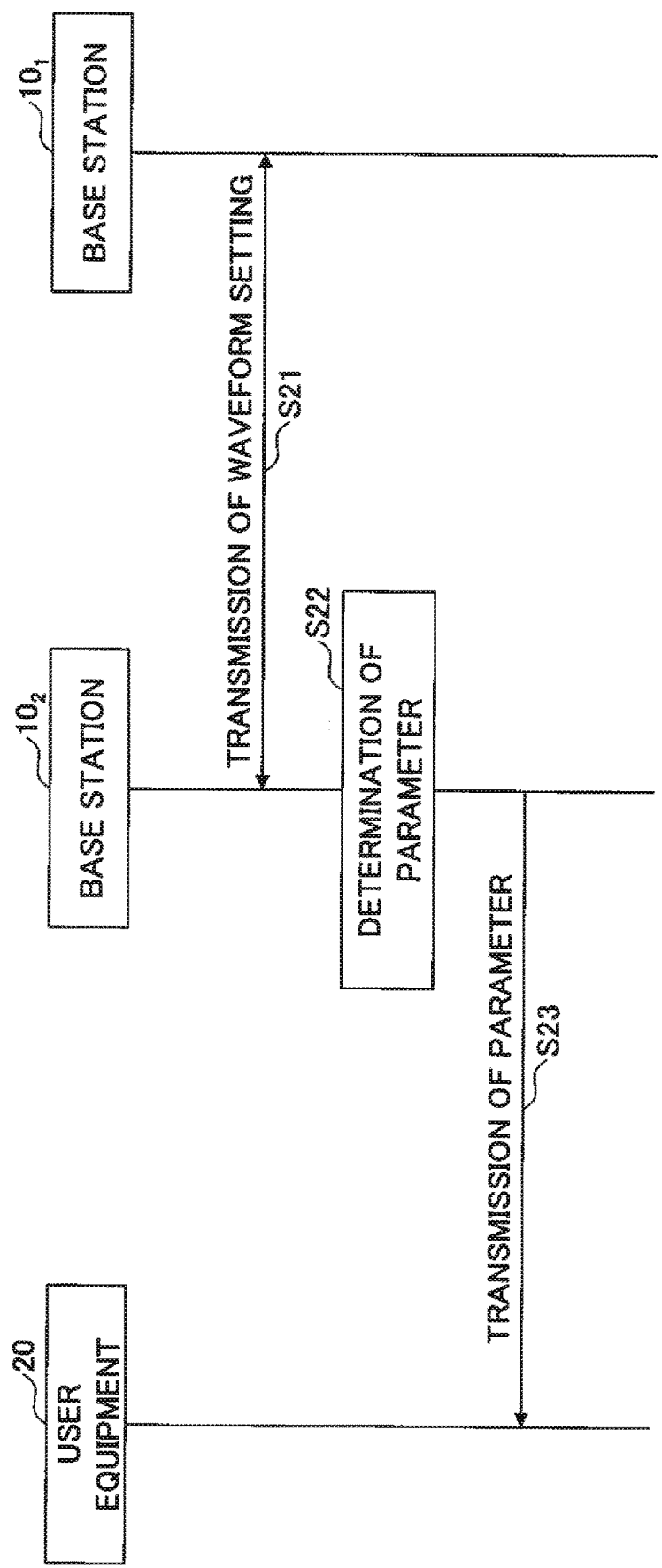
FIG. 5 is a sequence diagram illustrating an example of a procedure of controlling transmission power on the basis of a waveform of an adjacent cell.

FIG. 5 is a sequence diagram illustrating an example of a procedure of controlling transmission power on the basis of a waveform that is used by an adjacent cell. In FIG. 5, a base station 10$_1$ and a base station 10$_2$ are base stations which constitute adjacent cells. In addition, for convenience, FIG. 5 illustrates a configuration in which operations in step S22 and step S23 are performed by the base station 10$_2$. However, the base station 10$_1$ and the base station 10$_2$ have the same function, and thus the base station 10$_1$ and the base station 10$_2$ can perform the same operation.

In step S21, the base station 10$_1$ and the base station 10$_2$ give a notification of setting relating to the waveform (OFDM or DFT-s-OFDM), which is used in the UL, through an X2 interface. For example, information, which indicates that which waveform is to be set for a predetermined time unit (a sub-frame unit, a radio frame unit, and the like) and/or for a frequency region, may be given in notification between the base station 10$_1$ and the base station 10$_2$ to and from each other.

In step S22, the base station 10$_2$ determines a parameter that is given in instruction to the user equipment 20 in own cell on the basis of a waveform that is used in the UL in an adjacent cell (base station 10$_1$). The parameter, which is given in instruction to the user equipment 20 in the own cell, may be the MPR or the A-MPR which are described in the transmission power control method (Method 1), or the back off value (X) that is described in the transmission power control method (Method 2).

For example, in a case where both OFDM and DFT-s-OFDM are applicable in an adjacent cell, transmission power of a UL signal is greater in comparison to a case where only OFDM is used, and thus it is assumed that interference becomes great. Here, in a case where a waveform applicable to the UL in an adjacent cell (cell of the base station 10$_1$) includes OFDM and DFT-s-OFDM, the base station 10$_2$ may determine an MPR/A-MPR or a back off value which is smaller than an MPR/A-MPR or a back off value which is given in instruction to the user equipment 20 in own cell in a case where the waveform that is used in the UL by the adjacent cell (cell of the base station 10$_1$) is only OFDM. According to this, the base station 10 can perform a control of suppressing an interference effect from the adjacent cell by enlarging transmission power of the UL signal in own cell.

In step S23, the base station 10$_2$ notifies the user equipment 20 of the parameter that is determined. The base station 10$_2$ may notify the parameter that is determined to the entirety of user equipments in common. In this case, the base station 10$_2$ transmits the parameter that is determined in a state of being included in MIB, SIB, Message 2 and Message 4 in a random access sequence, or paging information. In addition, the base station 10$_2$ may give a notification of the parameter, which is determined, for an individual user equipment 20. In this case, the base station 10$_2$ transmits the parameter that is determined to the user equipment 20 in a state of being included in an RRC connection resetting message (RRC connection reconfiguration message), an S1 connection setting message, or a PDCCH (DCI).

As described above, according to the transmission power control method (Method 5), it is possible to control the transmission power of the user equipment 20 in correspondence with a waveform of an adjacent cell.

(Transmission Power Control Method (Method 6))

Figure 6:
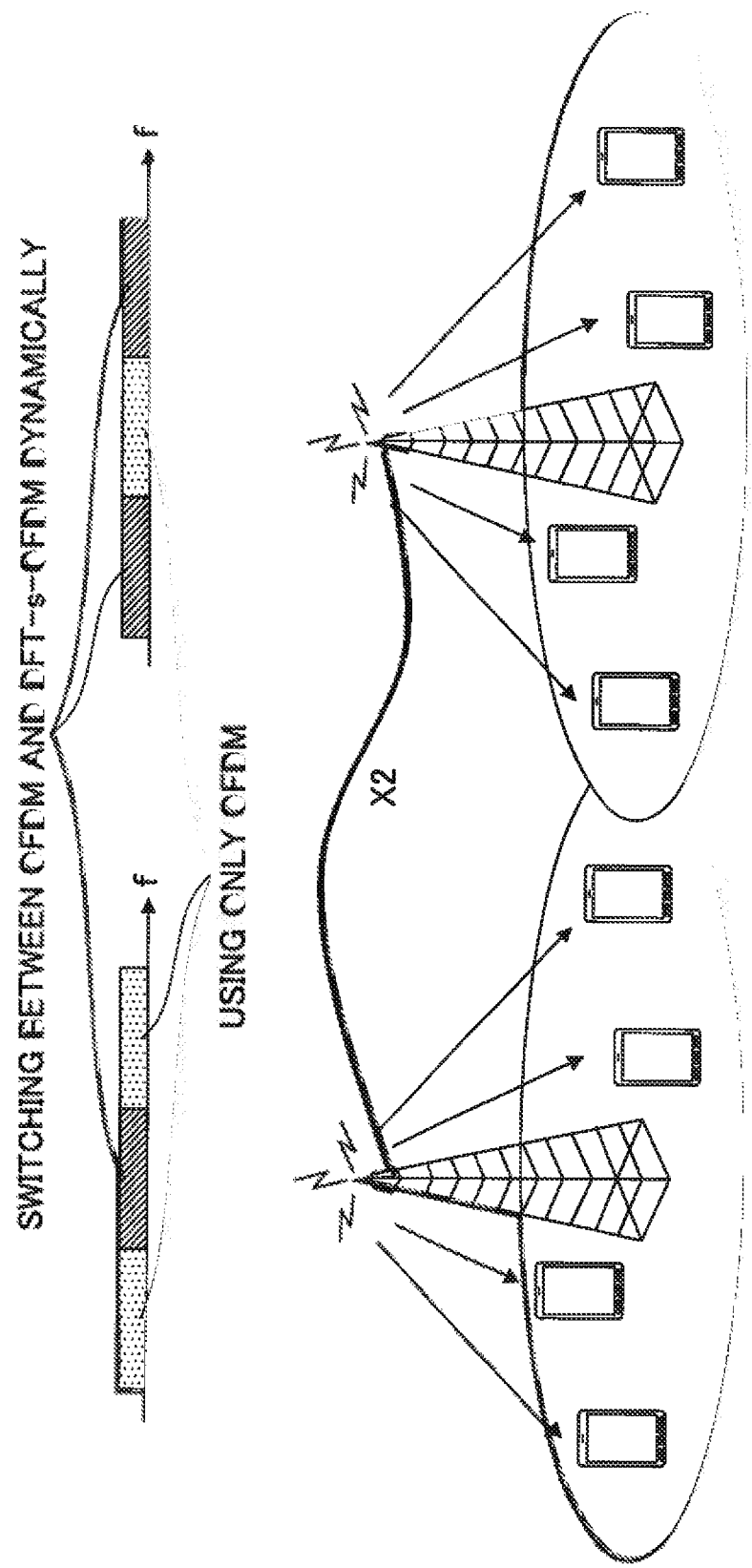
FIG. 6 is a view illustrating an operation of switching a waveform of own cell in accordance with a waveform of an adjacent cell.

In the transmission power control method (Method 6), the base station 10 is configured to switch a waveform, which is used in own cell, on the basis of a waveform (OFDM or DFT-s-OFDM) that is used in the UL by an adjacent cell. For example, in FIG. 6, a right side of FIG. 6 is set as an adjacent cell, and a left side of FIG. 6 is set as own cell. In this case, the base station 10 on the left side of FIG. 6 may perform switching in such a manner that only OFDM is used in a frequency region to which both OFDM and DFT-s-OFDM are applicable in the adjacent cell, and both OFDM and DFT-s-OFDM are applied in a frequency region in which only OFDM is used in the adjacent cell. In this embodiment, a UL signal that uses OFDM exists in the vicinity of the base station in comparison to a UL signal that uses DFT-s-OFDM, and transmission power thereof is controlled to be low, and thus it is possible to suppress an interference effect in an adjacent cell. On the other hand, only DFT-s-OFDM may be used in a frequency region in which DFT-s-OFDM is used in an adjacent cell, and OFDM may be used in a frequency region in which only OFDM is used in an adjacent cell. According to this, an interference level from an adjacent cell is set to the same extent, and thus it is possible to easily control transmission power.

<Functional Configuration>

Description will be given of a functional configuration example of the base station 10 and the user equipment 20 which execute the above-described embodiment. The base station 10 and the user equipment 20 according to this embodiment may include a function of executing the entirety of the transmission power control methods (Method 1 to Method 6), or may include a function of executing only a part of the methods.

(Base Station)

Figure 7:
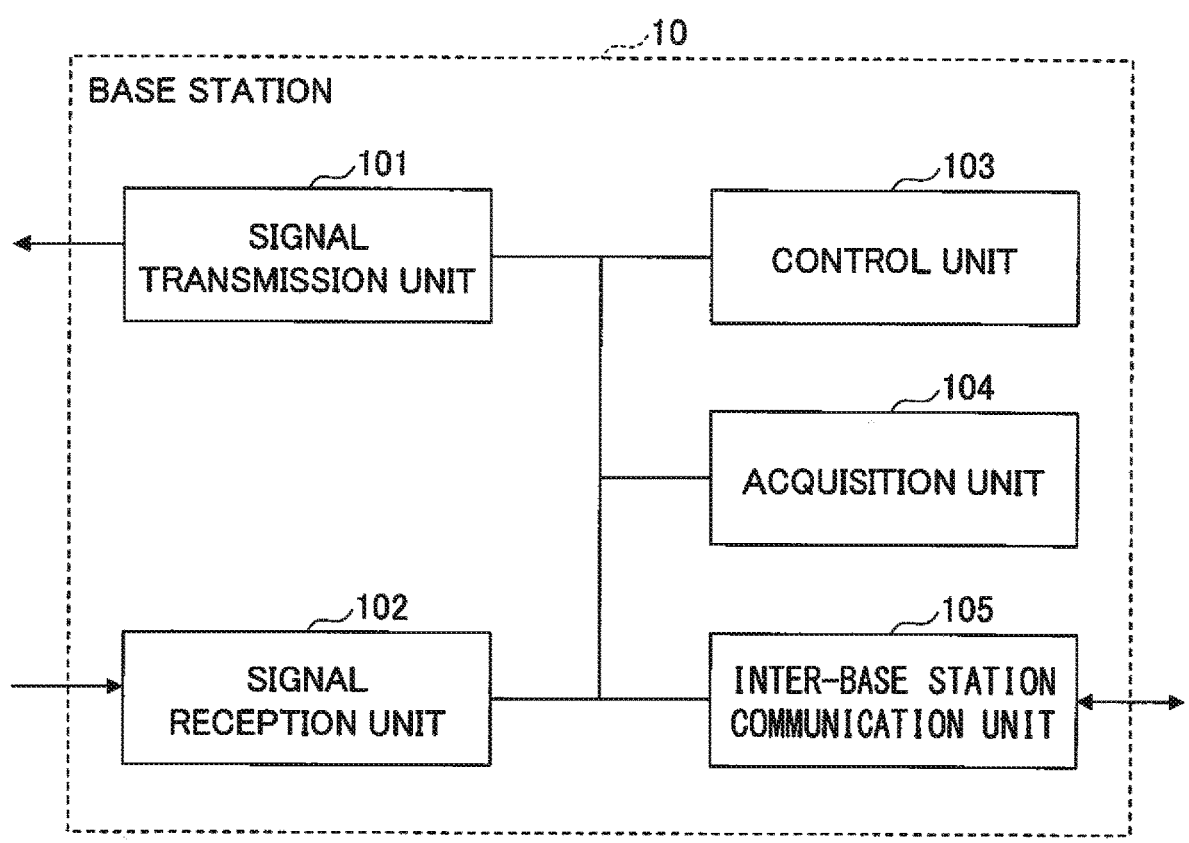
FIG. 7 is a view illustrating an example of a functional configuration of a base station according to the embodiment.

FIG. 7 is a view illustrating an example of a functional configuration of a base station according to the embodiment. As illustrated in FIG. 7, the base station 10 includes a signal transmission unit 101, a signal reception unit 102, a control unit 103, an acquisition unit 104, and an inter-base station communication unit 105. Furthermore, FIG. 7 illustrates only functional units which are particularly related to the embodiment of the invention in the base station 10. In addition, the functional configuration illustrated in FIG. 7 is illustrative only. A functional classification or the name of the functional units may be arbitrarily set as long as the operation according to this embodiment can be executed.

The signal transmission unit 101 includes a function of creating various signals of a physical layer from a signal of a higher layer to be transmitted from the base station 10, and wirelessly transmitting the signals. The signal reception unit 102 includes a function of wirelessly receiving various signals from the user equipment 20, and acquiring a signal of a further higher layer from a signal of a physical layer which is received.

The control unit 103 has a function of controlling transmission power of the user equipment 20 by notifying the user equipment 20 of a parameter (hereinafter, referred to as a first transmission power parameter) that is used to determine transmission power in a case of using OFDM in the UL, and a parameter (hereinafter, referred to as a second transmission power parameter) that is used to determine transmission power in a case of using DFT-s-OFDM in the UL through the signal transmission unit 101 by using the MIB, the SIB, the RRC message, the PDCCH, and the like.

In addition, the control unit 103 may perform a control in such a manner that the user equipment 20 changes a parameter to be applied in transmission of the UL signal between a case where another base station (base station that forms an adjacent cell) uses only OFDM in the UL and a case where the other base station can apply both OFDM and DFT-s-OFDM in the UL. For example, in a case where the other base station can apply both OFDM and DFT-s-OFDM to the UL, the control unit 103 may control a parameter (the first transmission power parameter or the second transmission power parameter) that is given in notification to the user equipment 20 in such a manner that transmission power further increases in comparison to a case where the other base station uses only the OFDM in the UL.

The acquisition unit 104 has a function of acquiring information, which indicates that the other base station uses OFDM or DFT-s-OFDM in the UL, from the other base station through an X2 interface. The inter-base station communication unit 105 has a function of performing a communication with another base station 10 by using the X2 interface.

(User Equipment)

Figure 8:
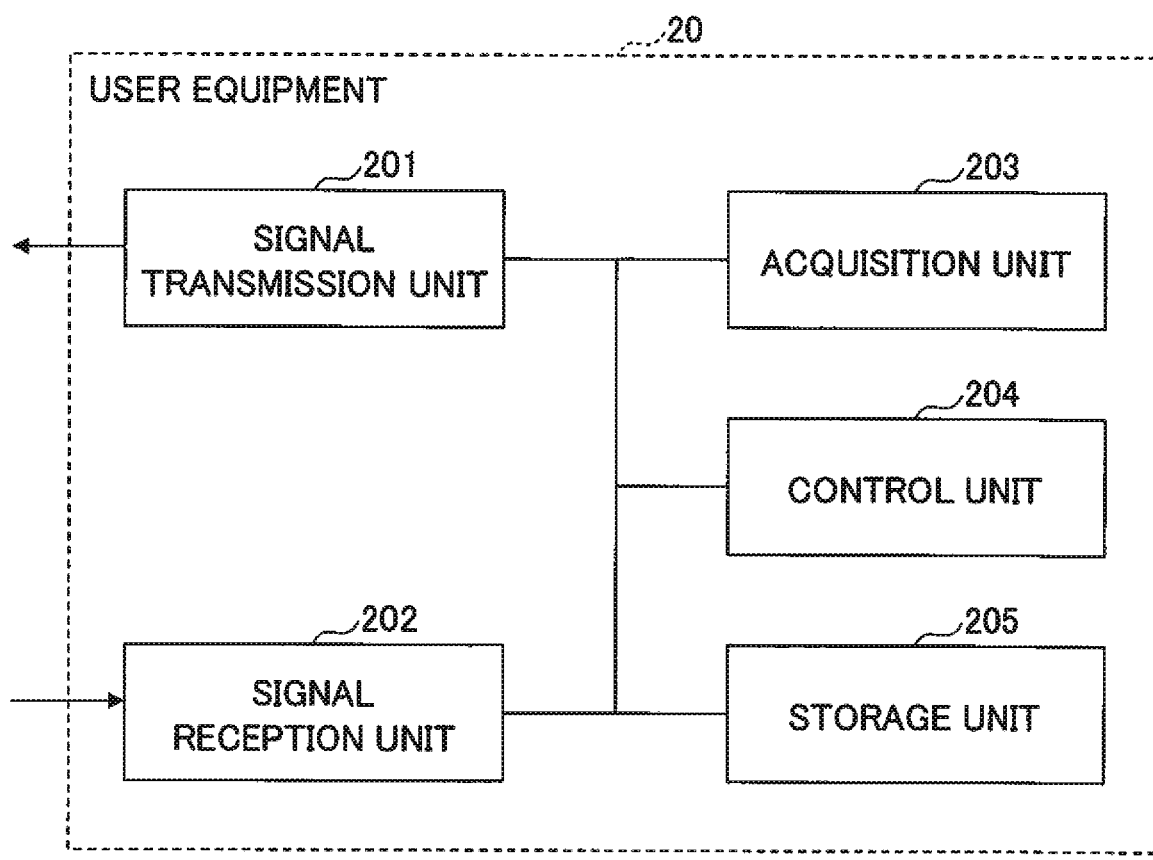
FIG. 8 is a view illustrating an example of a functional configuration of a user equipment according to the embodiment.

FIG. 8 is a view illustrating an example of a functional configuration of a user equipment according to the embodiment. As illustrated in FIG. 8, the user equipment 20 includes a signal transmission unit 201, a signal reception unit 202, an acquisition unit 203, a control unit 204, and a storage unit 205. Furthermore, FIG. 8 illustrates only functional units which are particularly related to the embodiment of the invention in the user equipment 20. In addition, the functional configuration illustrated in FIG. 8 is illustrative only. A functional classification or the name of the functional units may be arbitrarily set as long as the operation according to this embodiment can be executed.

The signal transmission unit 201 includes a function of creating various signals of a physical layer from a signal of a higher layer to be transmitted from the user equipment 20, and wirelessly transmitting the signal. The signal reception unit 202 includes a function of wirelessly receiving various signals from the base station 10, and acquiring a signal of a further higher layer from a signal of a physical layer which is received.

The acquisition unit 203 has a function of acquiring the first transmission power parameter in a case of using OFDM in the UL and the second transmission power parameter in a case of using DFT-s-OFDM in the UL. In addition, the acquisition unit 203 may acquire the first transmission power parameter and the second transmission power parameter from the storage unit 205. In addition, the acquisition unit 203 may acquire the first transmission power parameter and the second transmission power parameter from the base station 10.

In addition, a plurality of the first transmission power parameters and a plurality of the second transmission power parameters are defined in correspondence with the UE capability or the UE category, and the acquisition unit 203 may acquire the first transmission power parameter or the second transmission power parameter, which corresponds to the UE capability or the UE category of the user equipment 20, from the storage unit 205 or the base station 10.

The control unit 204 has a function of controlling transmission power of the UL signal by using the first transmission power parameter in a case of using ODFM in the UL, and controlling the transmission power of the UL signal by using the second transmission power parameter in a case of using DFT-s-OFDM in the UL. In addition, the first transmission power parameter may include a maximum power reduction and an additional maximum power reduction which are applied in a case of using OFDM in the UL, and the second transmission power parameter may include a maximum power reduction and an additional maximum power reduction which are applied in a case of using DFT-s-OFDM in the UL.

In addition, the first transmission power parameter may include a first back off value that is used in a case of using OFDM in the UL, the second transmission power parameter may include a maximum power reduction and an additional power reduction which are applied in a case of using DFT-s-OFDM in the UL, and the control unit 204 may control transmission power of an uplink signal by substituting the first back off value for a predetermined calculation formula for calculation of transmission power in a case of using ODFM in the UL, and may control transmission power of the uplink signal by substituting the second back off value for the predetermined calculation formula for calculation of transmission power in a case of using DFT-s-OFDM in the UL.

The storage unit 205 stores the first transmission power parameter and the second transmission power parameter.

<Hardware Configuration>

The block diagrams (FIG. 7 and FIG. 8) which are used in description of the embodiment illustrate blocks of a function unit. The functional blocks (constituent units) are realized by an arbitrary combination of hardware and/or software. In addition, means for realizing respective functional blocks is not particularly limited. That is, the respective function blocks may be realized by one device in which a physical combination and/or a logical combination are made. In addition, two or greater devices, which are physically and/or logically separated from each other, may be directly and/or indirectly (for example, wire and/or wirelessly) connected, and the respective function blocks may be realized by a plurality of the devices.

Figure 9:
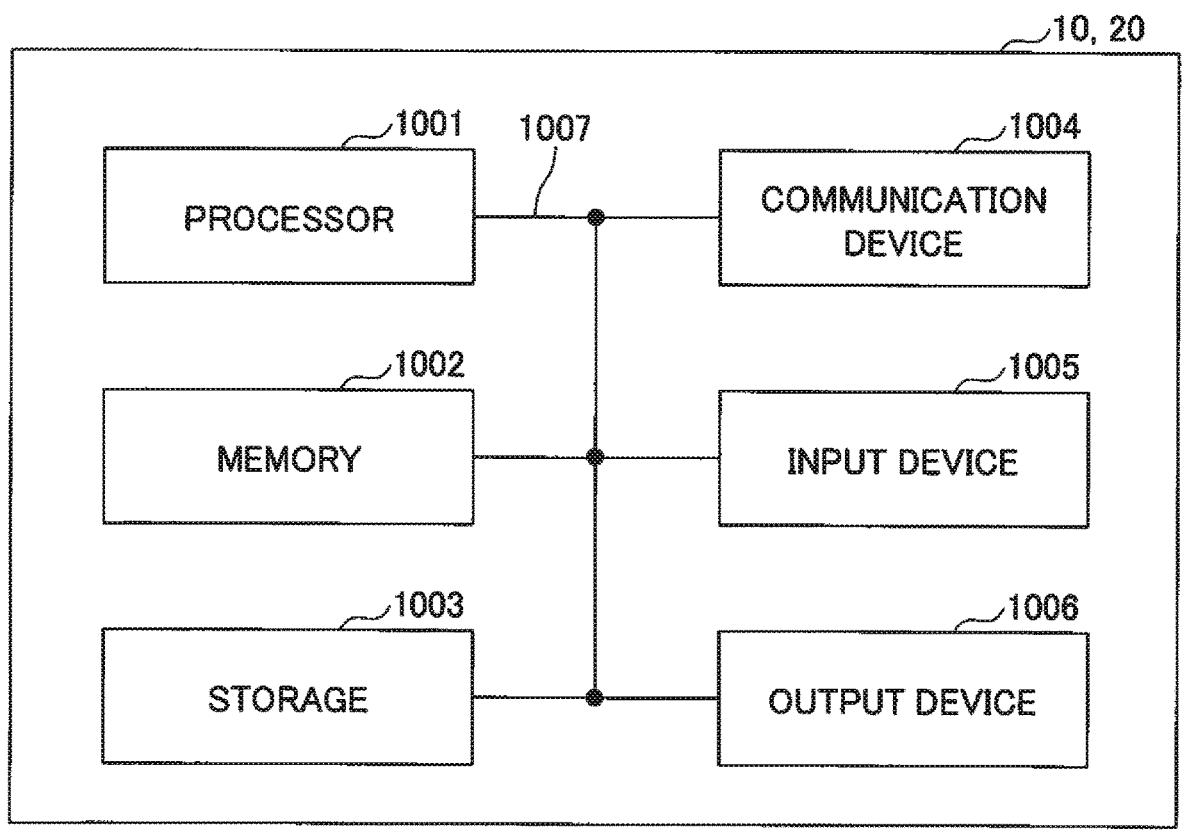
FIG. 9 is a view illustrating an example of a hardware configuration of the base station and the user equipment according to the embodiment.

For example, the base station 10, the user equipment 20, and the like in the embodiment of the invention may function as a computer that performs processing of the transmission power control method of the invention. FIG. 9 is a view illustrating an example of a hardware configuration of the base station and the user equipment according to the embodiment. The base station 10 and the user equipment 20 may be configured as a computer device that physically includes a processor 1001, a memory 1002, a storage 1003, a communication device 1004, an input device 1005, an output device 1006, a bus 1007, and the like.

Furthermore, in the following description, a term "device" may be substituted with a circuit, a unit, and the like. The hardware configuration of the base station 10 and the user equipment 20 may include the respective devices, which are illustrated in the drawing, one by one or in a plural number, or may not include a part of the devices.

Respective functions in the base station 10 and the user equipment 20 are realized by reading out predetermined software (program) from hardware such as the processor 1001 and the memory 1002 so as to allow the processor 1001 to perform an arithmetic operation, and by controlling a communication by the communication device 1004, and reading-out and/or input of data in the memory 1002 and the storage 1003.

For example, the processor 1001 allows an operating system to operate so as to control the entirety of the computer. The processor 1001 may be constituted by a central processing unit (CPU) that includes an interface with a peripheral device, a control device, an arithmetic operation device, a register, and the like. For example, the signal transmission unit 101, the signal reception unit 102, the control unit 103, the acquisition unit 104, and the inter-base station communication unit 105 of the base station 10, and the signal transmission unit 201, the signal reception unit 202, the acquisition unit 203, the control unit 204, and the storage unit 205 of the user equipment 20 may be realized by the processor 1001.

In addition, the processor 1001 reads out a program (program code), a software module, or data from the storage 1003 and/or the communication device 1004 into the memory 1002, and performs various kinds of processing according to the program, the software module, or the data. As the program, a program, which allows the computer to execute at least a part of the operations described in the embodiment, is used. For example, the signal transmission unit 101, the signal reception unit 102, the control unit 103, the acquisition unit 104, and the inter-base station communication unit 105 of the base station 10, and the signal transmission unit 201, the signal reception unit 202, the acquisition unit 203, the control unit 204, and the storage unit 205 of the user equipment 20 may be realized by a control program that is stored in the memory 1002 and is operated by the processor 1001. Another functional block may be realized in the same manner. The above-described various kinds of processing are described to be executed by one processor 1001, but may be simultaneously or sequentially executed by two or greater processors 1001. The processor 1001 may be mounted by one or greater chips. Furthermore, the program may be transmitted from a network through electric communication line.

The memory 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), and the like. The memory 1002 can retain a program (program code), a software module, and the like which can be executed to carry out the transmission power control method according to the embodiment of the invention.

The storage 1003 is a computer-readable recording medium, and may be constituted by at least one, for example, among an optical disc such as a compact disc ROM (CD-ROM), a hard disk drive, a flexible disk, a magneto-optical disc (for example, a compact disc, a digital multi-purpose disc, and a Blue-ray (registered trademark) disc), a smart card, a flash memory (for example, a card, a stick, a key drive), a floppy (registered trademark) disk, a magnetic strip, and the like. The storage 1003 may be referred to as an auxiliary storage device. For example, the above-described storage medium may be a database including the memory 1002 and/or the storage 1003, a server, and other appropriate media.

The communication device 1004 is hardware (transmission and reception device) that performs a communication between computers through a wire and/or a radio network, and may be referred to as, for example, a network device, a network controller, a network card, a communication module, and the like. For example, the signal transmission unit 101, the signal reception unit 102, and the inter-base station communication unit 105 of the base station 10, and the signal transmission unit 201 and the signal reception unit 202 of the user equipment 20 may be realized by the communication device 1004.

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. Furthermore, the input device 1005 and the output device 1006 may have an integral configuration (for example, a touch panel).

In addition, respective devices including the processor 1001, the memory 1002, and the like are connected to each other through a bus 1007 for an information communication. The bus 1007 may be configured as a single bus, or may be configured as a bus that is different between devices.

The base station 10 and the user equipment 20 may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by at least one piece of hardware.

<Summary>

As described above, according to the embodiment, there is provided a user equipment in a radio communication system including a base station and the user equipment. The user equipment includes: an acquisition unit that acquires a first transmission power parameter in a case of using OFDM in an uplink and a second transmission power parameter in a case of using DFT-s-OFDM in the uplink; and a control unit that controls transmission power of an uplink signal by using the first transmission power parameter in a case of using ODFM in the uplink, and controls transmission power of the uplink signal by using the second transmission power parameter in a case of using DFT-s-OFDM in the uplink. According to the user equipment, there is provided a technology of controlling transmission power in a case of using OFDM and in a case of using DFT-s-OFDM in the UL signal.

In addition, the acquisition unit may acquire the first transmission power parameter and the second transmission power parameter from a storage unit that is provided to the user equipment, the first transmission power parameter may include a maximum power reduction and an additional maximum power reduction which are applied in a case of using OFDM in the uplink, and the second transmission power parameter may include a maximum power reduction and an additional power reduction which are applied in a case of using DFT-s-OFDM in the uplink. According to this, the user equipment 20 can control maximum transmission power in correspondence with a waveform of the UL signal.

In addition, the acquisition unit may acquire the first transmission power parameter and the second transmission power parameter from the base station, the first transmission power parameter may include a first back off value that is used in a case of using OFDM in the uplink, the second transmission power parameter may include a second back off value that is used in a case of using DFT-s-OFDM in the uplink, and the control unit may control transmission power of an uplink signal by substituting the first back off value for a predetermined calculation formula for calculation of transmission power in a case of using ODFM in the uplink, and may control transmission power of the uplink signal by substituting the second back off value for the predetermined calculation formula for calculation of transmission power in a case of using DFT-s-OFDM in the uplink. According to this, the user equipment 20 can control transmission power in correspondence with a waveform of the UL signal.

In addition, a plurality of the first transmission power parameters and a plurality of the second transmission power parameters may be defined in correspondence with UE capability or a UE category, and the acquisition unit may acquire the first transmission power parameter or the second transmission power parameter in correspondence with the UE capability or the UE category of the user equipment. According to this, it is possible to control transmission power in correspondence with the UE capability or the UE category.

In addition, according to the embodiment, there is provided a base station in a radio communication system including a plurality of the base stations and a user equipment. The base station includes an acquisition unit that acquires information, which indicates that another base station is capable of applying both OFDM and DFT-s-OFDM in an uplink, or indicates that the other base station uses only OFDM in the uplink, from the other base station; and a control unit that changes a transmission power parameter, which is applied to transmission of an uplink signal by the user equipment, between a case where both OFDM and DFT-s-OFDM are capable of being applied to the uplink by the other base station, and a case where only OFDM is used in the uplink by the other base station. According to the base station, there is provided a technology of controlling transmission power in a case of using OFDM and in a case of using DFT-s-OFDM in the UL signal.

In addition, according to the embodiment, there is provided a transmission power control method that is executed by a user equipment in a radio communication system including a base station and the user equipment. The method includes: a step of acquiring a first transmission power parameter in a case of using OFDM in an uplink and a second transmission power parameter in a case of using DFT-s-OFDM in the uplink; and a step of controlling transmission power of an uplink signal by using the first transmission power parameter in a case of using ODFM in the uplink, and controlling transmission power of the uplink signal by using the second transmission power parameter in a case of using DFT-s-OFDM in the uplink. According to the transmission power control method, there is provided a technology of controlling transmission power in a case of using OFDM and in a case of using DFT-s-OFDM in the UL signal.

<Supplement of Embodiment>

The aspect and the embodiment which are described in this specification may be applied to long term evolution (LTE), LTE-Advanced (LTE-A), SUPER 3G, IMT-Advanced, 4G, 5G, future radio access (FRA), W-CDMA (registered trademark), GSM(registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

In the procedure, the sequence, the flowchart, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

Information that is input or output, and the like may be stored in a specific location (for example, a memory), or may be managed by a management table. The information that is input or output, and the like may be subjected to rewriting, updating, or additional writing. The information that is output, and the like may be deleted. The information that is input, and the like may be transmitted to other devices.

The aspect and the embodiment which are described in this specification may be used alone or in combination thereof, or may be switched and used in accordance with execution. In addition, notification of predetermined information (for example, notification of "a fact of X") is not limited to the explicit notification, and may be performed in an implicit manner (for example, notification of the predetermined information is not performed).

The information, the parameters, and the like which are described in this specification may be expressed as an absolute value, a relative value from a predetermined value, or separate information corresponding to the absolute value or the relative value. For example, the parameters (the MPR, the A-MPR, and the back off value) may be instructed by an index.

The names which are used in the above-described parameters (the MPR, the A-MPR, and the back off value) are not intended to be limited in any cases. In addition, mathematical expressions using the parameters, and the like may be different from mathematical expressions and the like which are explicitly disclosed in this specification. Various channels (for example, the PUCCH, the PUSCH, the SRS, and the like) can be identified in accordance with the entirety of suitable names, and thus various names, which are allocated to the various channels and information elements, are not intended to be limited in any case.

The term "determining" that is used in this specification may include various operations. For example, the term "determining" may include regarding of judging, calculating, computing, processing, deriving, investigating, looking up (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined".

The reference signal may be abbreviated as RS, and may be referred to as a pilot in accordance with a standard that is applied.

The user equipment 20 may be referred to as UE, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms by those skilled in the art.

Description of "on the basis of" in this specification does not represent "only on the basis of" unless otherwise stated. In other words, description of "on the basis of" represents both "only on the basis of" and "at least on the basis of".

Any reference with respect to elements, for which names such as "first", "second", and the like in this specification are used, is not intended to wholly limit the amount or the sequence of the elements. The names can be used in this specification as a convenient method for discrimination between two or greater elements. Accordingly, the reference with respect to first and second elements does not mean a configuration in which only two elements can be employed, or a configuration in which the first element is precedent to the second element in a certain aspect.

In a case where "include", "including", and a modification thereof are used in this specification and the appended claims, these terms are intended as comprehensive terms similar to "including (comprising)". In addition, a term ("or") that is used in this specification and the appended claims is not intended as an exclusive logical sum.

The "maximum transmission power" described in this example represents a maximum value of transmission power, but may be, for example, the nominal maximum transmission power (the nominal UE maximum transmit power) or the rated maximum transmission power (the nominal UE maximum transmit power).

In the entirety of the present disclosure, for example, in a case where articles such as "a", "an", and "the" are added in translation, the articles are intended to include a plural form as long as the opposite intention is not clearly indicated from the context.

It should be noted that the terms described in the present specification and/or terms necessary for understanding the present specification may be replaced by terms that have the same or similar meaning. For example, a channel and/or a symbol may be a signal. Further, a signal may be a message.

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

Hereinbefore, the invention has been described in detail, but it is apparent by those skilled in the art that the invention is not limited to the above-described embodiment in this specification. The invention can be executed a variation aspect and a modification aspect without departing from the gist or the scope of the invention which is determined by description of the appended claims. Accordingly, description in this specification is made for exemplary explanation, and does not have any limiting meaning with respect to the invention.

The present application is based on and claims priority to Japanese patent application No. 2016-215702 filed on Nov. 2, 2016, the entire contents of which are hereby incorporated by reference.

EXPLANATIONS OF LETTERS OR NUMERALS

10 Base station
20 User equipment
101 Signal transmission unit
102 Signal reception unit
103 Control unit
104 Acquisition unit
105 Inter-base station communication unit
201 Signal transmission unit
202 Signal reception unit
203 Acquisition unit
204 Control unit
205 Storage unit
1001 Processor
1002 Memory
1003 Storage
1004 Communication device
1005 Input device
1006 Output device

The invention claimed is:

1. A terminal comprising:
a control unit that controls transmission power of an uplink signal by using a first transmission power parameter that is applied in a case of using OFDM in uplink, and controls transmission power of an uplink signal by using a second transmission power parameter that is applied in a case of using DFT-s-OFDM in the uplink; and
a transmission unit that transmits the uplink signal with the transmission power,
wherein the first transmission power parameter and the second transmission power parameter are determined in accordance with a modulation method used for uplink transmission, and
wherein the modulation method includes at least one of QPSK, 16QAM, 64QAM, and 256 QAM.

2. The terminal according to claim 1,
wherein
the first transmission power parameter includes a maximum power reduction and an additional maximum power reduction which are applied in a case of using OFDM in the uplink, and
the second transmission power parameter includes a maximum power reduction and an additional maximum power reduction which are applied in a case of using DFT-s-OFDM in the uplink.

3. The terminal according to claim 2,
wherein a plurality of the first transmission power parameters and a plurality of the second transmission power parameters are defined in correspondence with UE capability or a UE category.

4. The terminal according to claim 1,
wherein a plurality of the first transmission power parameters and a plurality of the second transmission power parameters are defined in correspondence with terminal capability or a terminal category.

5. The terminal according to claim 1, wherein the terminal acquires the first transmission power parameter and the second transmission power parameter from a base station.

6. A base station in a radio communication system including a plurality of the base stations and a terminal, the base station comprising:
an acquisition unit that acquires information, which indicates that another base station is capable of applying both OFDM and DFT-s-OFDM in an uplink, or indicates that the other base station uses only OFDM in the uplink, from the other base station; and
a control unit that changes a transmission power parameter, which is applied to transmission of an uplink signal by the terminal, between a case where both OFDM and DFT-s-OFDM are capable of being applied to the uplink by the other base station, and a case where only OFDM is used in the uplink by the other base station.

7. A transmission power control method comprising:
a step of controlling transmission power of an uplink signal by using a first transmission power parameter that is applied in a case of using OFDM in uplink, and controlling transmission power of an uplink signal by using a second transmission power parameter in a case of using DFT-s-OFDM in the uplink; and
a step of transmitting the uplink signal with the transmission power,
wherein the first transmission power parameter and the second transmission power parameter are determined in accordance with a modulation method used for uplink transmission, and
wherein the modulation method includes at least one of QPSK, 16QAM, 64QAM, and 256 QAM.

* * * * *